(12) United States Patent
Zeelie

(10) Patent No.: US 10,538,715 B2
(45) Date of Patent: Jan. 21, 2020

(54) UPGRADING COAL FINES USING MICROALGAE

(71) Applicant: Nelson Mandela Metropolitan University, Port Elizabeth (ZA)

(72) Inventor: Bernard Zeelie, Port Elizabeth (ZA)

(73) Assignee: Nelson Mandela Metropolitan University, Port Elizabeth, EC (ZA)

( * ) Notice: Subject to any disclaimer, the term of this patent is extended or adjusted under 35 U.S.C. 154(b) by 0 days.

(21) Appl. No.: 14/892,873

(22) PCT Filed: May 8, 2014

(86) PCT No.: PCT/IB2014/061295
§ 371 (c)(1),
(2) Date: Nov. 20, 2015

(87) PCT Pub. No.: WO2014/188299
PCT Pub. Date: Nov. 27, 2014

(65) Prior Publication Data
US 2016/0115410 A1 Apr. 28, 2016

(30) Foreign Application Priority Data

May 21, 2013 (ZA) .................................. 2013/03681

(51) Int. Cl.
*C10L 5/04* (2006.01)
*B09B 3/00* (2006.01)
(Continued)

(52) U.S. Cl.
CPC .............. *C10L 5/04* (2013.01); *B09B 3/0008* (2013.01); *C10L 5/366* (2013.01); *C10L 9/10* (2013.01);
(Continued)

(58) Field of Classification Search
CPC .......... C10L 2290/54; C10L 5/06; C10L 5/08; C10L 5/361
See application file for complete search history.

(56) References Cited

U.S. PATENT DOCUMENTS

| | | | | |
|---|---|---|---|---|
| 3,993,455 A | * | 11/1976 | Reggel | C10L 9/02 44/624 |
| 2011/0143012 A1 | * | 6/2011 | Rettenmaier | B01D 53/84 426/648 |
| 2013/0199087 A1 | * | 8/2013 | Zeelie | C02F 1/283 44/605 |

FOREIGN PATENT DOCUMENTS

| | | |
|---|---|---|
| GB | 2000052 A | 1/1979 |
| JP | 2012180481 A | 9/2012 |

(Continued)

OTHER PUBLICATIONS

International Search Report in corresponding International Application No. PCT/IB2014/061295 dated Jul. 2, 2014.
(Continued)

*Primary Examiner* — Ellen M McAvoy
*Assistant Examiner* — Ming Cheung Po
(74) *Attorney, Agent, or Firm* — Andrus Intellectual Property Law, LLP

(57) ABSTRACT

A method for upgrading coal fines by separating out at least some mineral components is provided. The method comprises the treatment of optionally graded coal fines with microalgae in aqueous medium to form a slurry under conditions that permit adsorption of microalgae onto particles of coal fines. The slurry is treated to separate a first fraction that is rich in coal fines together with adsorbed microalgae thereon from a second fraction that has more mineral components in it than does the first fraction and processing the first fraction to recover upgraded coal fines therefrom. Contacting is preferably carried out in a manner (Continued)

aimed at loading the coal fines generally evenly with microalgae adsorbed thereon in an amount of from 5 to 15% by weight of coal fines. Separation may be carried out by sedimentation, cyclone separation or flotation.

12 Claims, 2 Drawing Sheets

(51) Int. Cl.
*C10L 5/36* (2006.01)
*C10L 9/10* (2006.01)

(52) U.S. Cl.
CPC ....... *C10L 2290/22* (2013.01); *C10L 2290/54* (2013.01)

(56) References Cited

FOREIGN PATENT DOCUMENTS

| WO | 2012025806 A1 | 3/2012 | |
|---|---|---|---|
| WO | WO 2012025806 A1 * | 3/2012 | .............. C02F 1/283 |
| WO | WO-2012025806 A1 * | 3/2012 | .............. C02F 1/283 |

OTHER PUBLICATIONS

European Search Report in corresponding European Application No. 14800551, dated Oct. 14, 2016.

\* cited by examiner

UPGRADING COAL FINES USING MICROALGAE

CROSS-REFERENCE TO RELATED APPLICATIONS

This application is the U.S. national stage application of International Application PCT/IB2014/061295, filed May 8, 2014, which international application was published on Nov. 27, 2014, as International Publication WO 2014/188299 in the English language. The International Application claims priority of South African Application No. 2013/03681, filed May 21, 2013.

FIELD OF THE INVENTION

This invention relates to the upgrading of fine and ultra-fine coal from waste coal dumps and run-of-mine fine coal using microalgae.

The term upgrading in this specification is intended to mean that the content of mineral components (ash content) of the fine coal is lowered, or the calorific value of the fine coal is increased, or both, irrespective of whether or not any desirable portions of the mineral components are to be recovered.

BACKGROUND TO THE INVENTION

Coal is a complex material that comprises both carbon-based chemical components and inorganic or mineral components that are herein collectively referred to as mineral components. The mineral components generally make up the ash content of the coal and play a significant role in determining the value of a particular coal. Generally, the higher the ash content of a coal, the lower is its value due to a correspondingly reduced energy content of the coal and the larger amount of waste that is produced during its use.

To separate such mineral components from coal, many procedures and processes are known in the art, including gravity separation, sedimentation and flotation. While coarse coal is readily separated from mineral impurities, fine coal (typically with a particle size of less than about 0.5 mm) is more difficult to separate and often lands up as "discard" coal in slurry dams from where it can either be re-worked, or dumped.

Mining and processing generally produce enormous quantities of coal fines that cannot be used in most normal coal applications such as energy generation as this coal is generally of low energy value due to the presence of large amounts of mineral components. Coal fines are also generally difficult to handle, process and transport.

Our earlier international patent application publication number WO 2012/025806 discloses that fine coal and other carbonaceous matter may conveniently be made available for use by agglomeration using microalgae biomass as binder for fine carbon particles.

Whilst it is expected that the present invention will predominantly be applied to coal fines per se, the expression coal fines should be interpreted broadly to embrace other carbonaceous fines such as may be experienced in the handling and processing of coke.

SUMMARY OF THE INVENTION

In accordance with this invention there is provided a method for upgrading coal fines by separating out at least some mineral components, the method comprising the treatment of coal fines with microalgae in aqueous medium by contacting coal fines with microalgae in water to form a slurry under conditions that permit adsorption of microalgae onto particles of coal fines, the method being characterized in that the slurry is treated to separate a first fraction that is rich in coal fines together with adsorbed microalgae thereon from a second fraction that has more mineral components in it than does the first fraction and processing the first fraction to recover upgraded coal fines therefrom.

Further features of the invention provide for the microalgae in aqueous medium to be in the form of substantially intact cells; for the absorption of microalgae onto coal/carbon particles to be carried out using microalgae grown in fresh water as opposed to salt water to avoid the presence of salts such as NaCl that may interfere with the effective absorption of the algae onto the coal surface by electrostatic competition; for the first fraction and the second fraction to be separated by sedimentation, cyclone separation or flotation; for the coal fines to be graded typically by size preparatory to contact with microalgae such that a predetermined range of sizes of particles is subjected to the adsorption of microalgae onto the coal fines and separation of the first fraction from the second fraction; for a plurality of suitable size ranges of particles to be produced with the aim of improving benefit from the method of this invention; for each size range produced to optionally be treated differently in order to facilitate adsorption of microalgae onto the coal fines and separation of the first fraction from the second fraction after adsorption of microalgae thereon; for contacting to be done either by mixing dry coal fines with algae slurry in water, or by adding concentrated algae slurry in water to coal fines that are already present in water such as coal fines leaving a coal processing plant; and for contacting to be carried out in a manner aimed at loading the coal fines generally evenly with microalgae adsorbed thereon in a preferred amount of from 5 to 15% by weight of the coal fines.

In instances in which the coal fines are sized, the manner in which the fines are sized is not critical and may, for example, be by screens, classifying cyclones, and density-based processes such as spirals, hydrocyclones, and heavy-media cyclones.

The present invention does not require any restriction to be placed on the particle size of coal fines that can be purified by separation into first and second fractions following the adsorption of microalgae. It is, however, preferred that the coal fines be sized so as to provide a reasonably equal size distribution so as to allow efficient separation of coal fines and mineral particles. The method of the present invention provides improved separation between coal fines and mineral particles with decreasing size of particles; hence smaller particle size ranges are preferred.

It should be noted that the absorption of microalgae onto coal is preferably done using coal that has not previously been flocculated using chemical flocculants. Accordingly, the invention is preferably applied to "run-of-the-mine" coal or fresh coal.

The actual amount of microalgae to be adsorbed will, in any event, depend on the actual particle size of the coal fines, or in the case of suitably small particles, the eventual use of the coal-microalgae mixture. Such a use may be as contemplated in WO 2012/025806. In the latter case, to order to achieve a desired microalgae loading, the amounts of microalgae in the source water and the amount of coal fines is first determined before mixing in the appropriate ratio.

The water containing the microalgae may be present in any concentration that would enable subsequent separation of fine coal particles from mineral particles to be effected. Typically, microalgae concentrations may vary from about 1 gram/litre to about 200 grams/litre.

Microalgae will most typically be derived from commercial cultivation systems such as a photo-bioreactor, pond, or raceway system, in which instance the contact constitutes harvesting of microalgae in a manner that will preserve the integrity of the harvested microalgae cells. For the invention to function optimally, it is preferred that microalgae cells are not broken during any processing step such as harvesting and that the microalgae cells are contacted with the coal fines as whole, or intact cells.

As may be required, any slurry may then be subjected to a separations step to remove mineral particles before recovering the coal-microalgae mixture from the remaining water slurry. The nature of this separation process will depend largely on the size of the particles of coal/mineral fines. Thus, when relatively coarse coal/mineral fines are treated, recovery from water may usually be achieved by preferential sedimentation of the mineral-containing solids.

When finer coal/mineral fines are used that do not settle quite as easily, other techniques such as froth flotation may be used to separate the first and second fractions and recover fine coal solids from the slurry. In the latter case, frothing agents may be added so as to recover the coal-microalgae particles, or the mineral particles selectively from the mixture. It is to be noted that it is convenient to use electrochemical flocculation to separate out the coal-microalgae solids by flocculation, settling and filtration.

Since microalgae carry a natural negative charge that stabilizes suspensions of microalgae in water, coal particles that contain absorbed microalgae also tend to form more stable suspensions in water, and this makes separation of mineral particles by sedimentation a preferred option as microalgae prefers to absorb onto carbon rather than mineral particles.

In order that the invention may be more fully understood, an expanded description of the invention follows with reference to the accompanying drawings.

DETAILED DESCRIPTION WITH REFERENCE TO THE DRAWINGS

Figure 1:
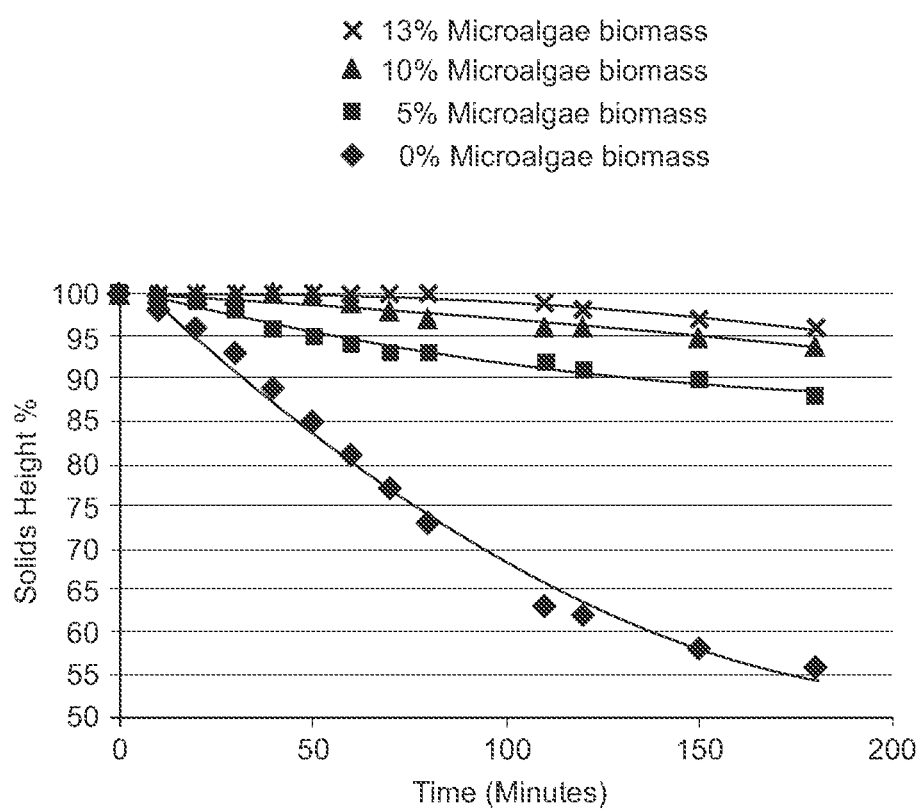
FIG. 1 is a graph showing the effect of different quantities of microalgae biomass on the settling rates of coal fines; and, FIG. 2 is a schematic illustration of apparatus used to test the settling rates of different size ranges of coal fines and mineral particles under different conditions.

Various tests were carried out on the effect on settling rates of coal fines that were treated by adsorbing microalgae in different quantities onto the coal fines. The coal fines, after any sizing or other pre-treatment, were contacted in a contact step with microalgae by a process appropriate to the state of the coal fines. Thus, contacting may be done either by mixing dry coal fines with algae slurry in water, or by adding concentrated algae slurry in water to the coal fines that are already present in water, for example coal fines leaving a coal processing plant.

In either event, contacting was carried out in a manner aimed at loading the coal fines evenly with microalgae adsorbed thereon in a preferred amount of from 5 to 10% by weight as will become more apparent from what follows.

The actual amount of microalgae to be adsorbed will, in any event, depend at least to some extent on the actual particle size of the coal fines, or in the case of suitably small particles, the eventual use of the coal-microalgae mixture. In the case of subsequent agglomeration as envisaged in our earlier international patent application publication number WO 2012/025806 a desired microalgae loading may be calculated according to the requirements of the agglomeration step. In any event, the amount of microalgae in a source water and the amount of coal fines is first determined before mixing in the desired ratio.

The microalgae may be present in any concentration in the source water that would enable subsequent separation of coal particles from mineral particles to be effected expeditiously. Typically microalgae concentrations may vary from about 1 gram/litre to about 200 grams/litre.

Microalgae will most typically be derived from commercial cultivation systems such as photo-bioreactors, ponds, or raceway systems, in which instance the contact with coal fines constitutes harvesting of microalgae under conditions that ensure that the integrity of the harvested microalgae cells is preserved as much as possible. It is to be noted that it is considered that for the invention to function optimally, it is preferred that microalgae cells are not broken during any processing step such as harvesting and are contacted with the coal fines as whole, or intact cells.

The resultant slurry is then subjected to a separations step to provide a first fraction containing upgraded coal fines and a second fraction that has more mineral components in it than does the first fraction. The overall effect is that of removal of some mineral particles from the first fraction before the coal-microalgae mixture is recovered from the remaining water solution.

The nature of this separation process will depend largely on the size of the particles of coal/mineral fines and the quantity of mineral present with the coal fines. When relatively coarse coal/mineral fines are treated, recovery from water may usually be achieved by preferential sedimentation of the mineral-containing solids.

When finer coal/mineral fines are used that do not settle quite as easily, other techniques such as froth flotation may be used to recover solids from the slurry. In the latter case, frothing agents may be added so as to selectively recover either the coal-microalgae particles predominantly, or the mineral particles predominantly from the mixture. Since microalgae carry a natural negative charge that stabilises suspensions of microalgae in water, coal particles that contain absorbed microalgae also tend to form more stable suspensions in water, and this makes separation of mineral particles by sedimentation a preferred option as microalgae prefers to adsorb onto carbon rather than mineral particles.

After separation, the coal fines together with the microalgae adsorbed thereon may be recovered in any convenient manner, including flocculation followed by sedimentation, froth flotation, or any other suitable means. The recovered coal fines together with the adsorbed microalgae thereon may be used as is following dewatering, or, for example, be subjected to an agglomeration step according to international patent application publication number WO 2012/025806.

EXAMPLES

Example 1: Illustration of the Stabilization of Coal Fines Slurries by Adsorbed Microalgae To 100 mL of coal slurry containing 124.8 g of solids/L of slurry there were added various amounts of wet microalgae biomass to give microalgae biomass loadings of approximately 0, 5, 10 and 13% on a mass/mass basis to the coal. The microalgae biomass fine coal slurry was mixed thoroughly to ensure complete mixing of the microalgae biomass into the fine coal slurry. The mixtures so derived were transferred into 100 mL measuring cylinders, and the rate of settling of the solids from the mixtures was monitored. It was noted that the fine coal solids in the measuring cylinder that contained no microalgae settled significantly faster than fine coal solids that were mixed with microalgae biomass. It was also noted that the effect of the microalgae biomass on the electrostatic properties of the fine coal solids revealed itself as non-adherence to the glass measuring cylinder surface of the particles when microalgae were present.

The results obtained are shown graphically in FIG. 1 as the distance that the solids settled over a period of three hours of settling time. It will be noted that in the instance of zero loading of microalgae biomass, settling took place to a level of about 56% of the height of the measuring cylinder; in the instance of a 5% microalgae biomass loading, to a level of about 88% of the height of the measuring cylinder; in the instance of 10% microalgae biomass loading, to a level of about 94% of the height of the measuring cylinder; and in the instance of 13% microalgae biomass loading, to a level of about 96% of the height of the measuring cylinder. This shows a considerable resistance to settling of the coal fines loaded with microalgae biomass with probably the most cost-effective loading being about 10% microalgae biomass.

Figure 2:
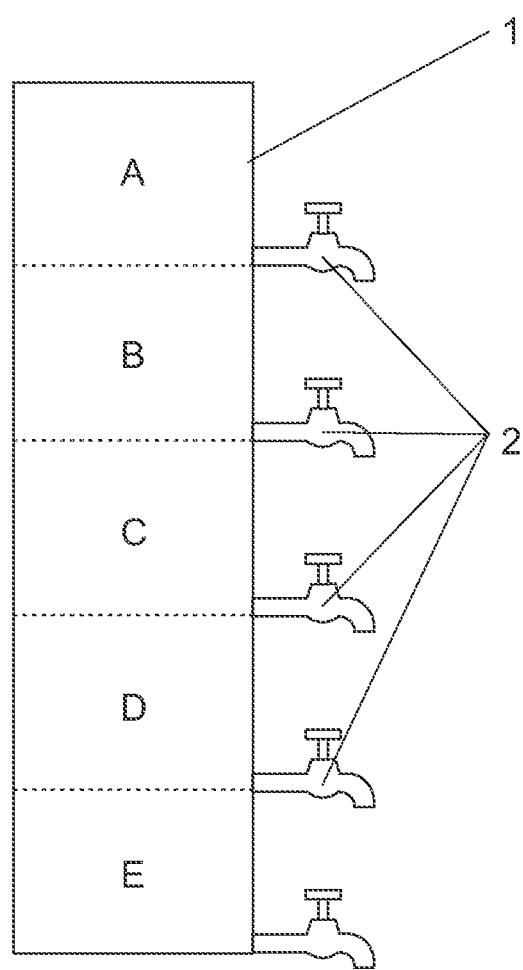

Example 2: Determination of the Effect of Microalgae Adsorption on the Settling of Different Size Ranges of Coal Fines For these tests a graduated volumetric cylinder (1) having a 2 litre capacity was modified, as illustrated in FIG. 2, by the installation of five taps (2) so as to give approximately equal volumes in each of the five sections indicated by the letters A-E in FIG. 2.

Coal was milled and screened into fractions falling in the following ranges: 500-150 µm; 150-106 µm; 106-53 µm; <53 µm. From each fraction a sample of 200 g was taken, mixed with 2000 g of water using a high-speed stick blender and poured into the apparatus shown in FIG. 2. The mixture was allowed to stand for 15 minutes before all the liquid in each of the sections marked A-E was collected in separate containers starting at the top and working downwards. The coal solids from each section were isolated, the amount determined, and the energy value of the coal solids from each section measured. The results are shown in the left hand four columns of Table 1 below and all relate to fine coal without any microalgae adsorbed thereon.

A second sample of 180 g was taken from each size fraction, and mixed with 20 g (dry mass basis) of a wet, centrifuged and washed microalgae sample. The same test was conducted on the coal fines together with the microalgae and the results are shown in the right hand four columns of Table 1 below. The results summarized in Table 1 clearly show the decrease in the amount of carbon (coal) contained in the lowermost section E when microalgae is present on the coal and an increase in the amount of carbon (coal) present in the upper sections.

TABLE 1

| | Coal solids recovery as a function of position | | | | | | | |
| --- | --- | --- | --- | --- | --- | --- | --- | --- |
| Position | C* 150-500** | C* 106-150** | C* 53-106** | C* 5-53** | CA*** 150-500** | CA*** 106-150** | CA*** 53-106** | CA*** 5-53** |
| | % of Total Solids | | | | | | | |
| A | 1.78 | 1.18 | 1.27 | 4.02 | 3.03 | 1.79 | 2.19 | 1.85 |
| B | 2.48 | 5.25 | 5.17 | 10.33 | 2.62 | 6.38 | 1.81 | 15.05 |
| C | 8.64 | 10.74 | 11.91 | 15.89 | 3.96 | 14.50 | 11.39 | 19.12 |
| D | 13.46 | 16.98 | 16.96 | 20.64 | 21.78 | 20.19 | 28.65 | 26.77 |
| E | 73.64 | 65.84 | 64.70 | 49.12 | 68.60 | 57.14 | 55.96 | 37.21 |

*Coal only;
**Sieve size for bottom/upper sieve;
***Coal and Algae

On the basis of what is described above and tests conducted to date it is quite apparent that an efficient and effective separation of a fine coal can take place when the fine coal is treated with microalgae which changes the properties and characteristics of the fine coal to the extent that a first fraction can be separated from a second fraction with an increase in the amount of mineral particles in the second fraction and an increase in the amount of coal fines relative to the mineral particles in the first fraction.

Physical separation of the fine coal particles from impurities after adsorption of microalgae can be achieved in any one of available state-of-the-art methodologies, including flotation, flocculation/sedimentation, and filtration. Recovered coal fines may conveniently be agglomerated by briquetting, pelletization, extrusion or any other suitable agglomeration process according to international patent application publication number WO 2012/025806 in amongst other techniques.

The decrease in the mineral content of fine coal has the effect of reducing the ash content of the fine coal contained in the first fraction and improving the calorific value of the final product. A further benefit of the present invention is the incorporation of biomass in an intimate manner with coal which significantly improves the combustion behaviour of such coal.

Numerous different permutations and combinations of processes fall within the scope of the invention and the discussion above is not intended to be limiting in any way.

It is to be noted that in all tests conducted to date it was noted that the addition of microalgae to the fine coal did not affect the rate of settling of mineral particles to the same extent as it affected the rate of settling of the fine coal itself.

It will be understood that numerous different processes for separating mineral particles from fine coal particles in order to upgrade the latter fall within the scope of this invention without departing from the scope thereof. Any particular process will undoubtedly depend for its detailed design on the nature of the coal fines to be treated and the form in which they exist.

The invention claimed is:

1. A method for upgrading run-of-the-mine coal fines including mineral-containing solids by removing at least some of the mineral-containing solids, the method comprising:

treating the run-of-the-mine coal fines with microalgae in aqueous medium by contacting the run-of the-mine coal fines with microalgae in water to form a slurry under conditions that ensure that the integrity of the microalgae cells is preserved to permit preferential adsorption of substantially intact microalgae cells onto particles of coal fines rather than onto the mineral-containing solids;

forming a stabilized suspension of coal fines with adsorbed substantially intact microalgae cells thereon which is separated from the mineral-containing solids that do not form part of the stabilized suspension;

separating the slurry of microalgae and run-of-the-mine coal fines in aqueous medium into a first fraction that is rich in coal fines together with adsorbed substantially intact micro-algae cells thereon derived from the stabilized suspension and a second fraction that has more mineral-containing solids in it than does the first fraction; and dewatering the first fraction that is rich in coal fines together with the substantially intact microalgae cells adsorbed thereon to recover upgraded coal fines from the aqueous medium.

2. A method for upgrading run-of-the-mine coal fines including mineral-containing solids as claimed in claim 1 in which the first fraction and the second fraction are separated by a process selected from sedimentation, cyclone separation and flotation.

3. A method for upgrading run-of-the-mine coal fines including mineral-containing solids as claimed in claim 2 in which the slurry is treated to separate the first fraction from the second fraction by froth flotation wherein frothing agents are added so as to recover the coal-microalgae particles, or the mineral particles selectively from the mixture.

4. A method for upgrading run-of-the-mine coal fines including mineral-containing solids as claimed in claim 1 in which the run-of-the-mine coal fines including mineral-containing solids are graded into predetermined ranges of sizes of particles preparatory to being subjected to the adsorption of microalgae onto the coal fines and separation of the first fraction from the second fraction.

5. A method for upgrading run-of-the-mine coal fines including mineral-containing solids as claimed in claim 4 in which grading is effected by any one or more of screens, classifying cyclones, density-based spirals, density-based hydrocyclones, and density-based heavy-media cyclones.

6. A method for upgrading run-of-the-mine coal fines including mineral-containing solids as claimed in claim 4 in which each of a plurality of different size ranges produced are treated differently from each other in order to facilitate adsorption of microalgae onto the coal fines and separation of the first fraction from the second fraction after adsorption of microalgae thereon.

7. A method for upgrading run-of-the-mine coal fines including mineral-containing solids as claimed in claim 1 in which contacting is done by mixing dry coal fines with algae slurry in water.

8. A method for upgrading run-of-the-mine coal fines including mineral-containing solids as claimed in claim 1 in which contacting is done by adding concentrated algae slurry in water to coal fines that are already present in water.

9. A method for upgrading run-of-the-mine coal fines including mineral-containing solids as claimed in claim 1 in which contacting is carried out in a manner aimed at loading the coal fines generally evenly with microalgae adsorbed thereon in an amount of from 5 to 15% by weight of coal fines.

10. A method for upgrading run-of-the-mine coal fines including mineral-containing solids as claimed in claim 1 in which the microalgae are present in a concentration of from 1 gram/litre to 200 grams/litre.

11. A method for upgrading run-of-the-mine coal fines including mineral-containing solids as claimed in claim 1 in which the microalgae are derived from commercial cultivation systems selected from a photo-bioreactor, a pond, or a raceway system, in which instance the contact constitutes harvesting of microalgae in a manner that will preserve the integrity of the harvested microalgae cells.

12. A method for upgrading run-of-the-mine coal fines including mineral-containing solids as claimed in claim 2 wherein the first fraction and the second fraction are separated by sedimentation of the mineral-containing solids from the stabilized suspension of coal fines with adsorbed microalgae thereon followed by the removal of the second fraction that has more mineral-containing solids in it than does the first fraction from the water slurry.

* * * * *